United States Patent
Loh et al.

(10) Patent No.: US 10,790,869 B1
(45) Date of Patent: Sep. 29, 2020

(54) SPLIT SCREEN PHONE CARRYING CASE WITH STAND

(71) Applicant: Fosmon IP Holding Company, LLC, Woodbury, MN (US)

(72) Inventors: Shung Yat Loh, Woodbury, MN (US); Ho Yin Lee, Woodbury, MN (US); Ping Hay Heun, Woodbury, MN (US)

(73) Assignee: FOSMON IP HOLDING COMPANY, LLC, Woodbury, MN (US)

( * ) Notice: Subject to any disclaimer, the term of this patent is extended or adjusted under 35 U.S.C. 154(b) by 0 days.

(21) Appl. No.: 16/434,586

(22) Filed: Jun. 7, 2019

(51) Int. Cl.
| H04M 1/00 | (2006.01) |
| H04B 1/3888 | (2015.01) |
| H04M 1/02 | (2006.01) |
| A45C 11/00 | (2006.01) |
| H04M 1/18 | (2006.01) |

(52) U.S. Cl.
CPC ............ *H04B 1/3888* (2013.01); *A45C 11/00* (2013.01); *H04M 1/0214* (2013.01); *A45C 2011/002* (2013.01); *H04M 1/185* (2013.01)

(58) Field of Classification Search
CPC . A45C 11/00; A45C 13/005; A45C 2011/003; H04M 1/022; H04M 1/185; H04M 1/0214; H04M 1/0247; H04B 1/3888; H04B 1/3827
See application file for complete search history.

(56) References Cited

U.S. PATENT DOCUMENTS

| 8,378,932 B2 | 2/2013 | Fein et al. |
| 8,418,852 B2 | 4/2013 | Ziemba |
| 8,504,127 B2 | 8/2013 | Altschul et al. |
| 8,759,675 B2 | 6/2014 | Rajeswaran et al. |
| 8,910,915 B2 | 12/2014 | Wibby et al. |
| 8,942,773 B2 | 1/2015 | Wu |
| 8,989,826 B1 | 3/2015 | Connolly |
| 9,049,283 B1 | 6/2015 | Kim |
| 9,119,316 B2 | 8/2015 | Lee |
| 9,281,858 B2 | 3/2016 | Fathollahi |
| 9,618,760 B2 | 4/2017 | Cornford |
| 9,654,605 B2 | 5/2017 | Goldfain et al. |
| 9,768,822 B1 | 9/2017 | Loh et al. |
| 9,939,847 B2 | 4/2018 | Kee et al. |
| 10,064,298 B2 | 8/2018 | Cavenagh et al. |
| 10,180,704 B1 | 1/2019 | Stewart et al. |
| 10,258,127 B2 | 4/2019 | Johnson et al. |
| 10,492,318 B2 | 11/2019 | Cavenagh et al. |

(Continued)

FOREIGN PATENT DOCUMENTS

| CN | 2469764 Y | 1/2002 |
| CN | 204669429 U | 5/2015 |

(Continued)

*Primary Examiner* — Nhan T Le
(74) *Attorney, Agent, or Firm* — Haugen Law Firm PLLP

(57) ABSTRACT

A protective carrying case for a foldable mobile electronic device is provided having a concealed storage compartment. The concealed compartment may store credit cards, identification cards and other personal articles. The case also includes an integrated stand that enables a user to prop the foldable mobile device at a desired angle. The case further includes a window to expose the back display of a foldable mobile device.

12 Claims, 20 Drawing Sheets

(56) References Cited

U.S. PATENT DOCUMENTS

| | | |
|---|---|---|
| 2002/0104769 A1* | 8/2002 | Kim .................... G06F 1/1601 206/320 |
| 2009/0039546 A1* | 2/2009 | Honma ............... H04M 1/0214 264/241 |
| 2010/0072334 A1 | 3/2010 | Le Gette et al. |
| 2011/0077061 A1 | 3/2011 | Danze et al. |
| 2011/0294542 A1 | 12/2011 | Ray et al. |
| 2012/0147536 A1 | 6/2012 | Sa |
| 2013/0220847 A1 | 8/2013 | Fisher et al. |
| 2014/0016217 A1 | 1/2014 | Rayner |
| 2014/0066142 A1 | 3/2014 | Gipson |
| 2014/0066143 A1 | 3/2014 | Choi |
| 2014/0128132 A1 | 5/2014 | Cox, III |
| 2014/0263939 A1 | 9/2014 | Rinner |
| 2014/0378193 A1 | 12/2014 | Biancamano et al. |
| 2015/0011265 A1 | 1/2015 | Walsh, Jr. |
| 2015/0069099 A1 | 3/2015 | Diebel et al. |
| 2015/0129095 A1 | 5/2015 | Marin |
| 2015/0230570 A1 | 8/2015 | Kim |
| 2015/0375894 A1 | 12/2015 | Idehara et al. |
| 2016/0014922 A1 | 1/2016 | Banerjee et al. |
| 2016/0088750 A1 | 3/2016 | Wu |
| 2016/0113368 A1 | 4/2016 | Tu et al. |
| 2016/0206062 A1* | 7/2016 | Marvin .................. A45C 11/00 |
| 2018/0191394 A1* | 7/2018 | Kao .................... H04B 1/3888 |
| 2018/0213902 A1 | 8/2018 | Lim |
| 2018/0295736 A1 | 10/2018 | Cavenagh et al. |
| 2018/0352924 A1 | 12/2018 | Lim |
| 2019/0029135 A1 | 1/2019 | Park et al. |
| 2019/0053592 A1 | 2/2019 | Johnson et al. |

FOREIGN PATENT DOCUMENTS

| | | |
|---|---|---|
| CN | 205160602 U | 11/2015 |
| TW | M451788 U1 | 4/2013 |

\* cited by examiner

SPLIT SCREEN PHONE CARRYING CASE WITH STAND

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

The present invention relates generally to protective cases for foldable electronic devices. More particularly, the present invention relates to a non-intrusive split screen foldable mobile phone protective case having a support stand and concealed compartment for use as a mobile phone carrying case.

BACKGROUND

Mobile electronic devices, such as cellular phones, tablets and laptops often include an external housing that may shatter or sustain damage from an impact. The damage from impact may result in a cracked screen, scratches on a finished surface, and/or failed or malfunctioning electrical components. Complimentary casings have been provided to reduce potential damage from impact. However, in the past, these complimentary casings have been bulky, reducing the overall aesthetic appearance of the mobile device. Further, the increased bulk of these cases contradicts a consumer's desire for a compact mobile (lightweight and small sized) device. Additionally, there may be a desire to increase the functionality of the case by adding practical structures to the case, however these added structures typically further add to the bulk and weight of the case. An increase in bulk or weight may result in a cumbersome and less desirable case.

Further, although reducing bulk is desirable, users of mobile electronic devices may at times desire a device that includes both a larger display and a smaller display incorporated into a single mobile electronic device. To meet the user needs, mobile electronic devices may include a larger foldable display on one side of the device and a smaller display incorporated into one of the two halves of the other side of the foldable device. It is a further desire to provide a protective covering that not only reduces the effects of impact on the edges of the foldable mobile device but that also provides a covering at the fold axis of the mobile device. Accordingly, there is a desire to minimize the bulkiness and weight of protective cases for foldable mobile devices while maintaining impact protection and additional versatility.

SUMMARY

Embodiments according to aspects of the present invention provide a covering for a foldable electronic device that absorbs shock while also including a concealed storage compartment. The protective covering includes two halves or shells that are interconnected with a flexible hinge. One halve includes a folding panel that may be utilized to conceal a storage compartment and may also be altered to prop up or stand the foldable electronic device at a desired angle. The other halve includes a window or opening that exposes a back display of the foldable electronic device. A user may unfold the case to view the enlarged front display or may keep the case closed and utilize the back display.

The protective covering or carrying case in accordance with aspects of the present invention may include a first shielding body or halve, a second shielding body or halve, an extendable hinge, and a cover panel to conceal an article compartment. The first shielding body has a first cavity formed into a first side of the first shielding body. A second cavity is formed into a second side of the first shielding body, such that the first side of the shielding body opposes the second side of the shielding body. The first and second cavities are separated by a dividing wall. The first cavity is adapted for receiving a first portion of the foldable electronic device and the second cavity is adapted for receiving one or more articles, such as a credit card or identification. The second shielding body has a recess adapted for receiving a second portion of the foldable electronic device. The first and second shielding bodies interconnect with a flexible hinge. The first shielding body includes a cover that extends over the second cavity of the first protective body.

In embodiments of the protective covering, the case may include a cover panel having a first end portion fixed to an outer surface of the first shielding body and a second free end portion that is adapted to extend over and cover the second cavity. The cover panel may include a plurality of joints about which the cover may bend. The hinge may also include a plurality of folds around which the hinge pivots and bends. A first end of the hinge may be fixed to the first shielding body and a second end of the hinge may slide within slots formed in the first shielding body. Alternatively, a first end of the hinge may be fixed to the second shielding body and slide in slots formed in the first shielding body. Further, portions of the extendible hinge may extend from the slots formed in the shielding body when the foldable electronic device is in the folded position and those portions of the hinge retract into the shielding body along the slots when the foldable electronic device is in the open position. Additionally the cover panel may be adaptable to fold or bend into a stand that provides support to a carrying case. The hinge that couples the first and second shielding bodies both bends and slides between a first closed position and a second open position of the foldable electronic device. The folds of the hinge are defined by a plurality of hinge joints.

In accordance with aspects of the invention, an embodiment of the invention includes a protective covering for a foldable mobile electronic device. The protective covering includes two halves that are configured to be user removable from the foldable mobile device. The mobile device includes a front display formed from two halves of the mobile device and a rear display exposed on a back side of one of the halves of the mobile device, wherein the front display is not visible when the mobile electronic device is in a folded position.

The protective covering includes a first case or halve, a second case or halve, a hinge interconnecting the first and second case, and a cover panel that covers a concealed compartment. The first case has a first cavity formed into a first side of the first case and a second cavity formed into a second side of the first case. The first side of the first case opposes the second side of the first case and a dividing wall separates the first and second cavities. The first cavity is adapted for receiving a first portion of the foldable mobile electronic device and the second cavity is adapted for receiving one or more articles. The second case has a recess adapted for receiving a second portion of the foldable mobile electronic device. The second case includes a window extending through the second case to expose the rear display when the foldable mobile electronic device is contained within the protective covering. The cover panel has a first end portion fixed to an outer surface of the first case and a second free end portion that is adapted to extend over and cover the second cavity.

In embodiments of the invention the first case further includes an aperture or window formed and extending through the first case, wherein the aperture is aligned with at least a portion of a camera aperture or lens of the foldable mobile electronic device. The hinge may include a plurality of folds around which the hinge pivots. A first end of the hinge is fixed to the second case and a second end of the hinge slides within the slots formed in the first case. In this manner as the cases are folded, the hinge bends and extends out of the slots. When the cases are opened, the folds straighten and a portion of the hinge retracts along the slots into the first case. Those skilled in the art will appreciate that slots may instead be formed in the second case and the fixed end of the hinge coupled to the first case. Portions of the hinge extends from the slots formed in the case when the foldable electronic device is in the folded position and retracts along the slots when the foldable electronic device is in the open position. The hinge both bends and slides between a first closed position and a second open position of the foldable electronic device. Also, the cover panel is adaptable to fold and provide a stand for the support.

In accordance with further aspects of the invention an embodiment of the protective covering includes a first case, second case, hinge and cover. The first and second cases couple to halves of a foldable mobile electronic device and is configured to be user removable from the foldable mobile device. The foldable mobile device may include a front display formed from halves of the mobile device and a rear display exposed on a back side of one of the halves of the mobile device. The front display is not visible when the mobile electronic device is in a folded position. The first case has a first cavity formed into a first side of the first case and a second cavity formed into a second side of the first case. The first side of the first case opposes the second side of the first case. The first and second cavity are separated by a dividing wall such that the first cavity is adapted for receiving a first portion of the foldable mobile electronic device and the second cavity is adapted for receiving one or more articles.

An aperture or window is formed and extends through the dividing wall, wherein the window or aperture is adapted to align with at least a portion of a camera aperture of the foldable mobile electronic device. The second case has a recess adapted for receiving a second portion of the foldable mobile electronic device and has a window extending through the second case to expose the rear display when the foldable mobile electronic device is contained within the protective covering.

The first case interconnects to the second case with a hinge, wherein the hinge includes a plurality of folds around which the hinge pivots. The first end of the hinge is fixed to the second case and a second end of the hinge slides within slots formed in the first case. Portions of the hinge extends from the slots formed in the first case when the foldable electronic device is in the folded position and retracts along the slots when the foldable electronic device is in the open position. The cover panel has a first end portion fixed to an outer surface of the first case and a second free end portion that is adapted to extend over and cover the second cavity. The hinge both bends and slides between a first closed position and a second open position of the foldable electronic device.

The hinged panel stand has a first end portion fixed to an outer surface of the second case and a second free end portion that is adapted to extend over and cover the second cavity. A portion of the hinged panel includes a plurality of hinge joints, allowing the panel to be altered from a flat configuration to a multi fold or triangular configuration. In embodiments of the invention the protective covering includes magnets and metal strips that may be associated with the hinged panel. The magnets and metal strips act together to retain the hinged panel in either a flat, concealing manner or a folded stand forming manner. The second side of the first case may further include flanges extending inward from the second cavity sidewalls to block outer access to a portion of the second cavity. The flanges restrict objects placed in the second cavity from falling out of the storage compartment formed by the cavity and flanges. Those skilled in the art will appreciate that a variety of hinged stands or flaps and access opening configurations may be utilized in accordance with the present invention.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
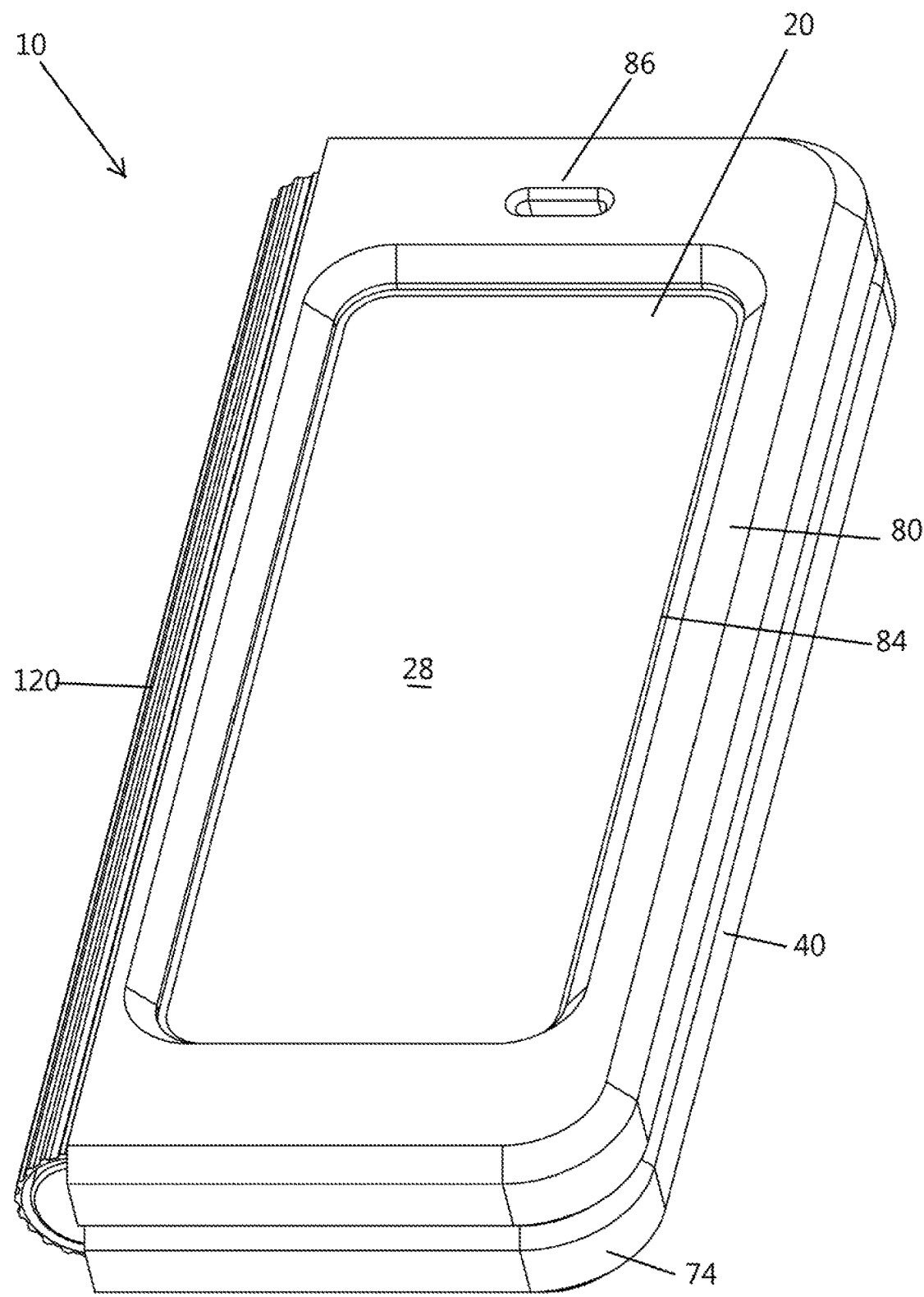
FIG. 1 is a partial back perspective view of a carrying case in accordance with the present invention showing a back portion of one halve of the carrying case and illustrating a foldable smart phone contained by the carrying case in a folded position.
Figure 2:
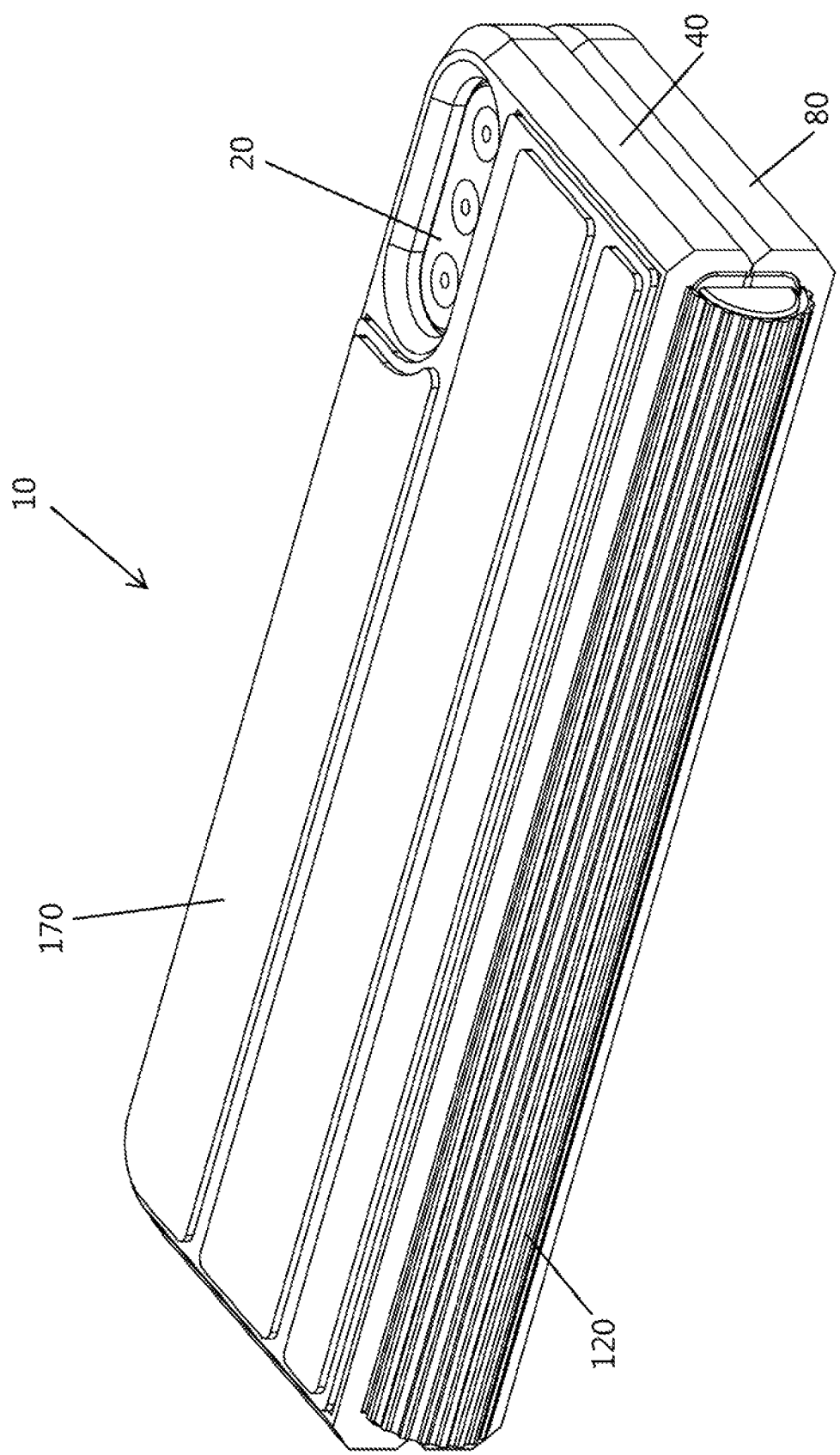
FIG. 2 is a partial back side perspective view of a carrying case in accordance with the present invention showing a back portion of one halve of the carrying case and illustrating a foldable smart phone contained by the carrying case in a folded position.
Figure 3:
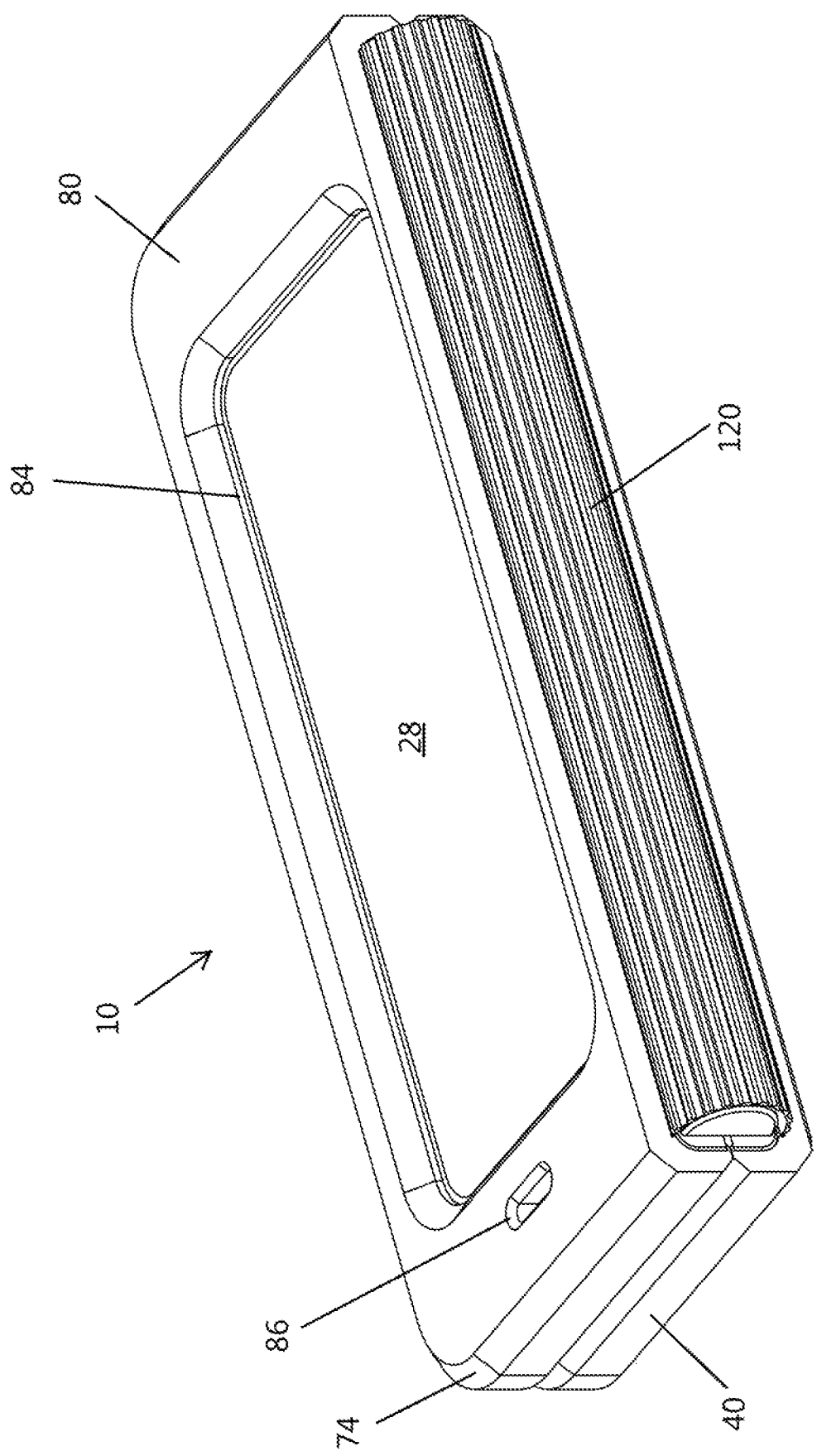
FIG. 3 is a partial back side perspective view of a carrying case in accordance with the present invention showing a back portion of one halve of the carrying case and illustrating a foldable smart phone contained by the carrying case in a folded position.
Figure 4:
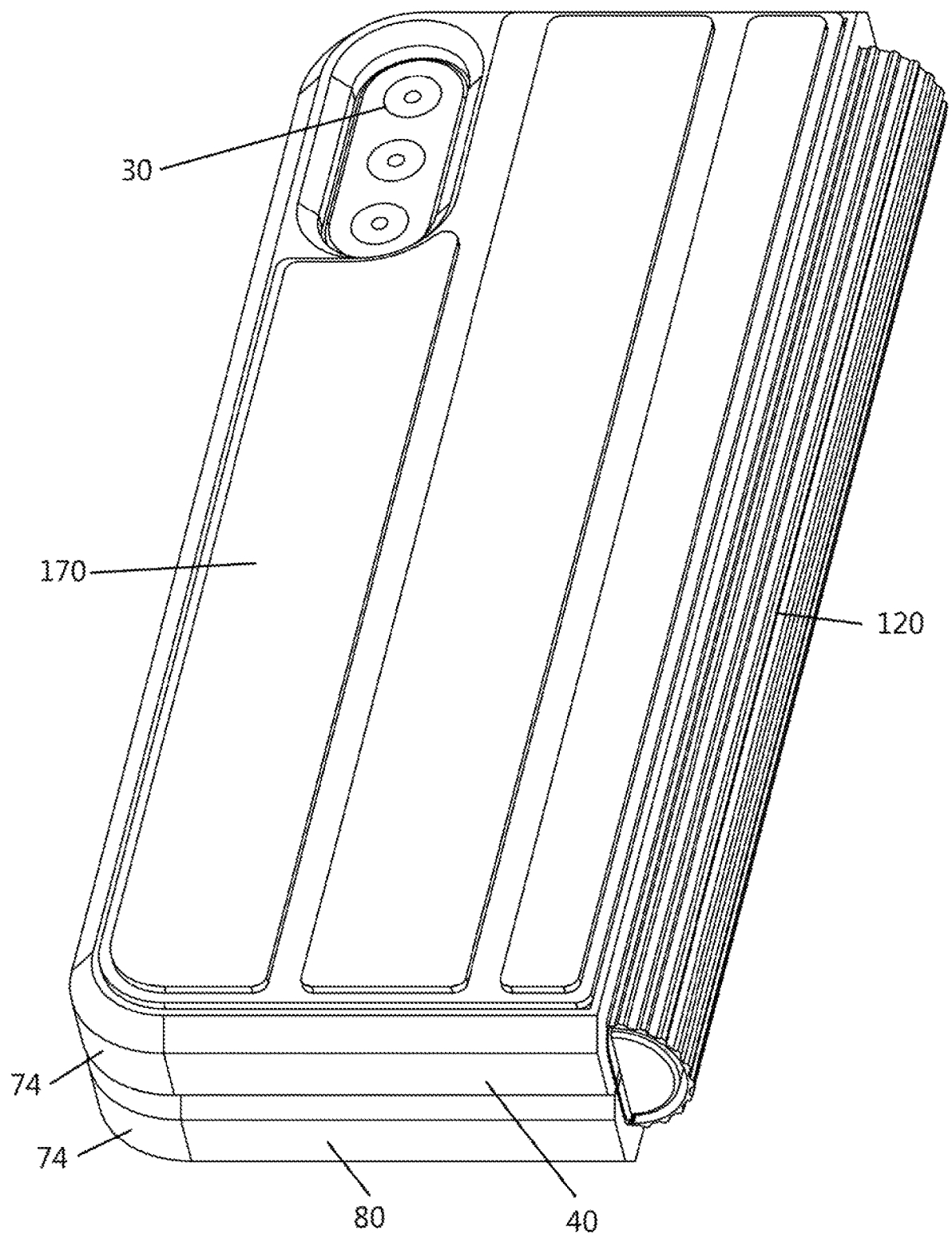
FIG. 4 is a partial back perspective view of a carrying case in accordance with the present invention showing a back portion of a halve of the carrying case and illustrating a foldable smart phone contained by the carrying case in a folded position.
Figure 5:
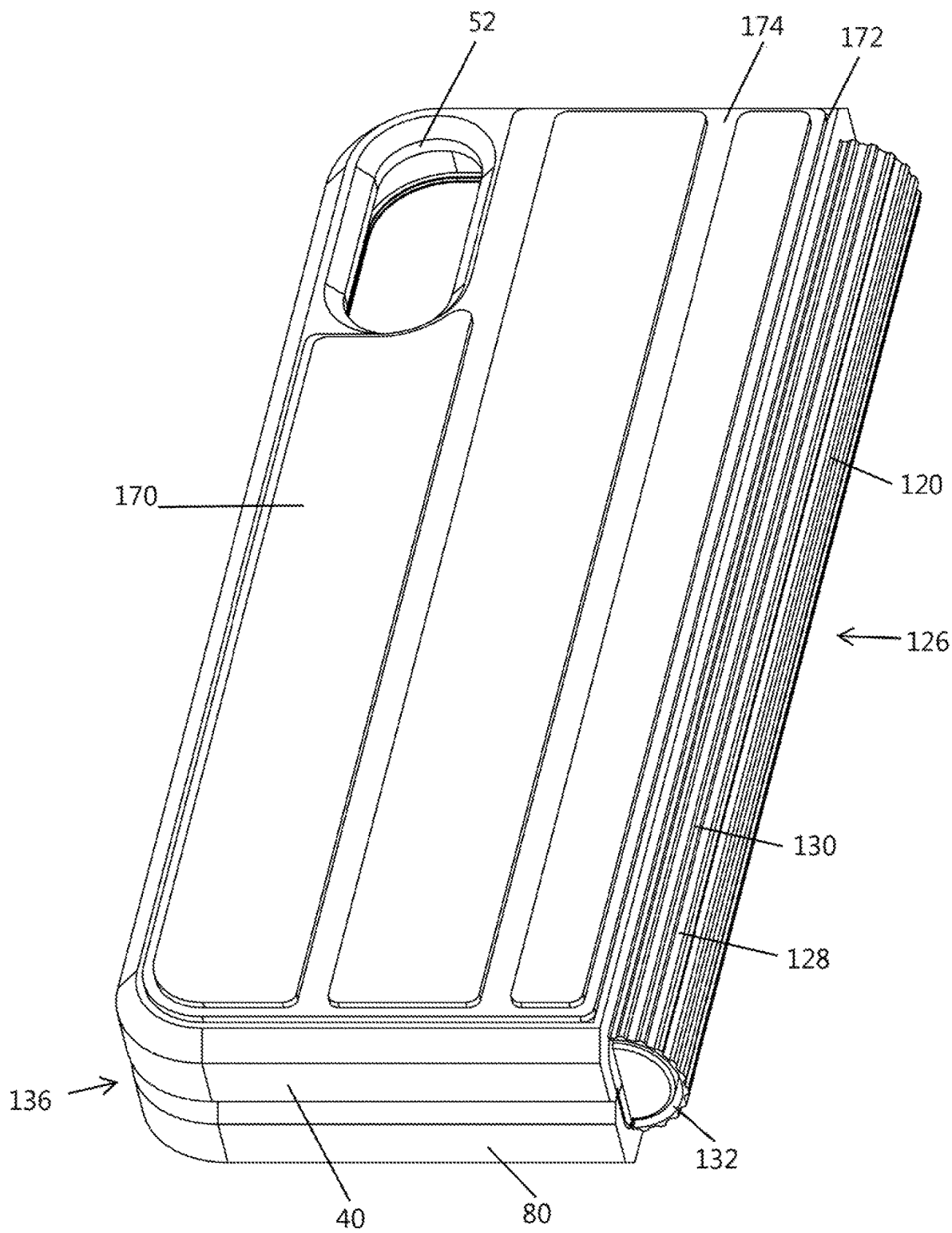
FIG. 5 is a partial back perspective view of a carrying case in accordance with the present invention showing a back portion of a halve of the carrying case and illustrating the carrying case in a folded position without a foldable smart phone contained by the carrying case.
Figure 6:
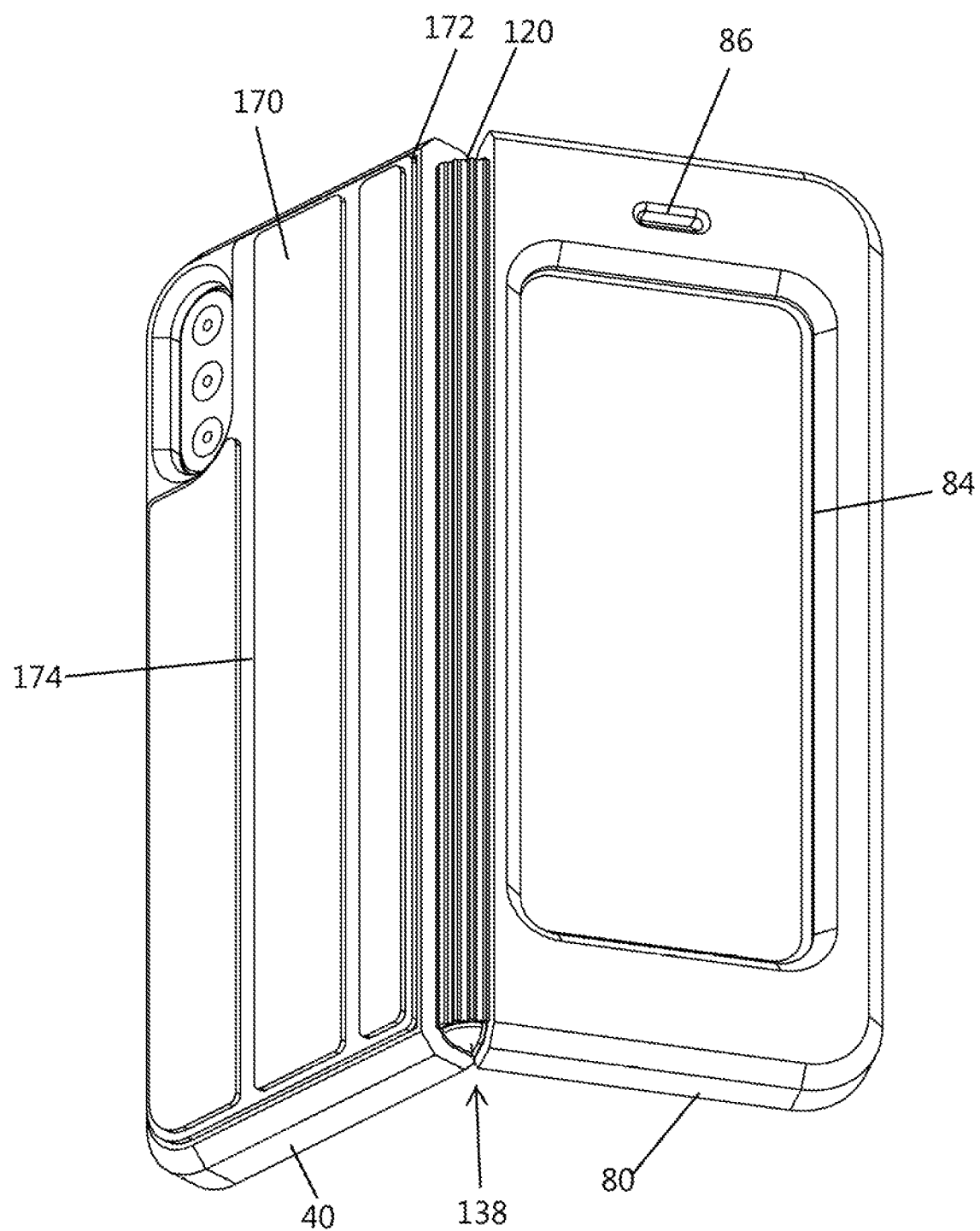
FIG. 6 is a back perspective view of the carrying case in accordance with the present invention and illustrating the carrying case in a partially open position with a foldable smart phone contained by the carrying case.
Figure 7:
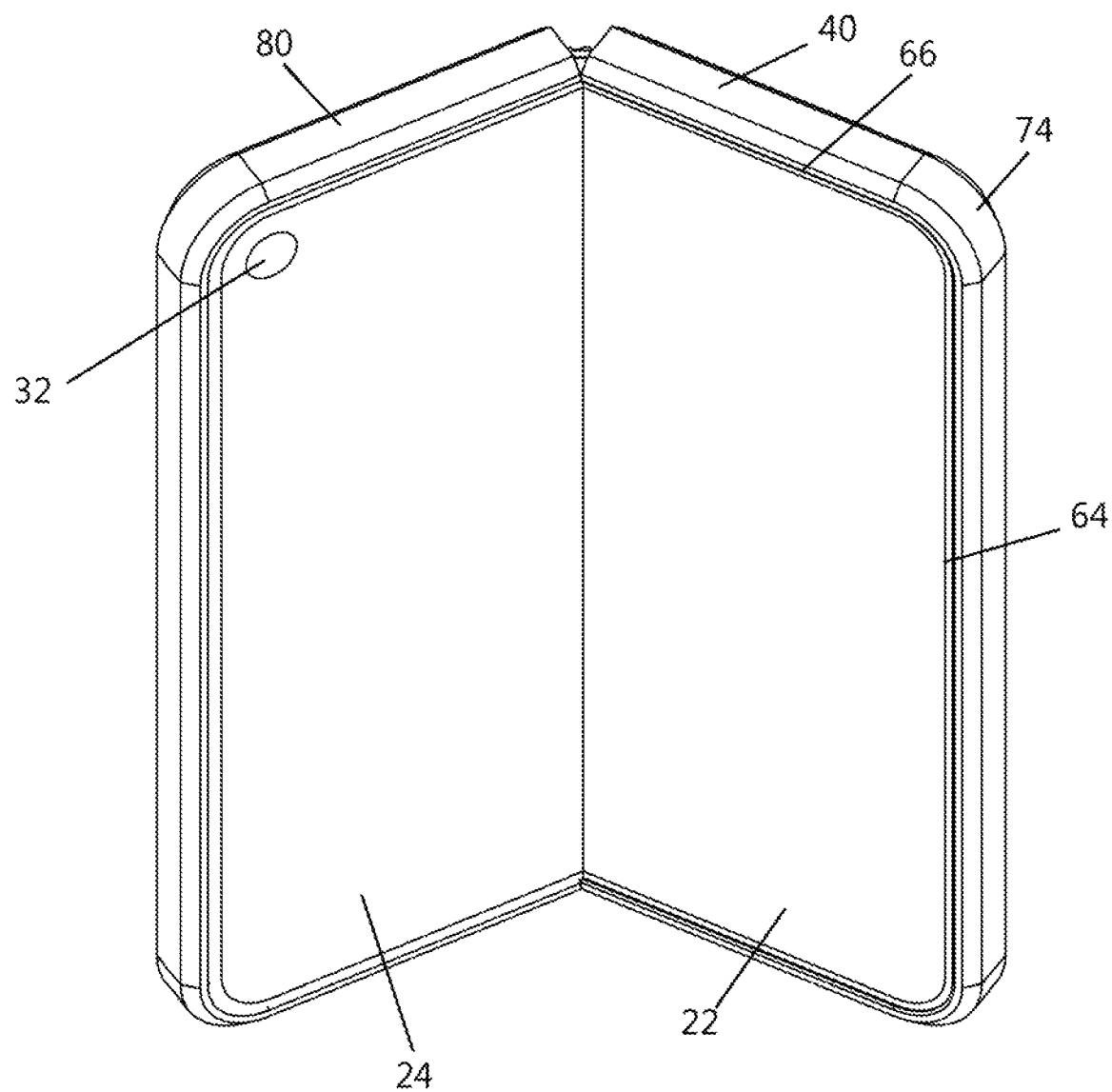
FIG. 7 is a front perspective view of the carrying case in accordance with the present invention and illustrating the front of the carrying case in a partially open position with a foldable smart phone contained by the carrying case.
Figure 8:
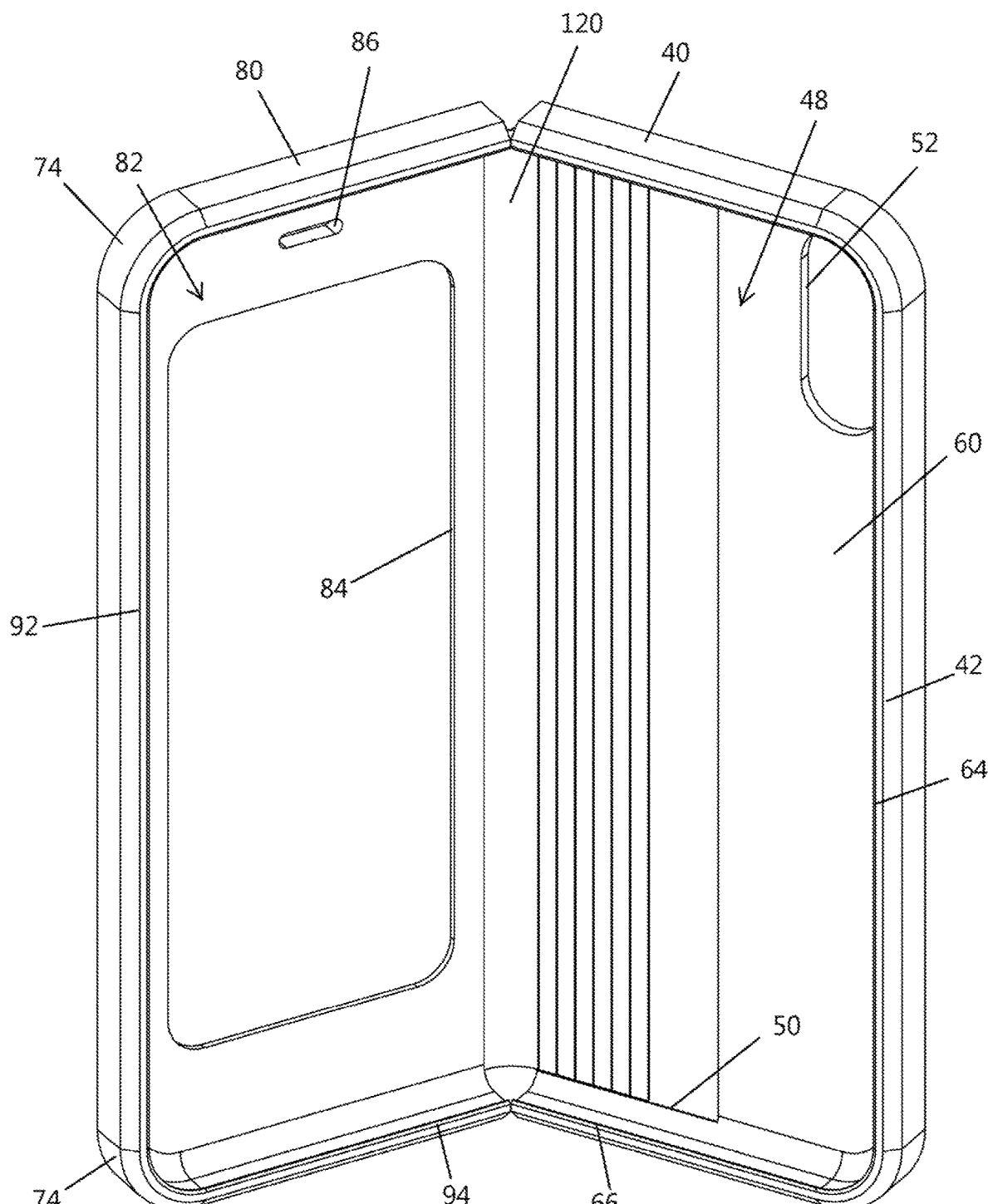
FIG. 8 is a front perspective view of the carrying case in accordance with the present invention and illustrating the front of the carrying case in a partially open position without a foldable smart phone contained by the carrying case.
Figure 9:
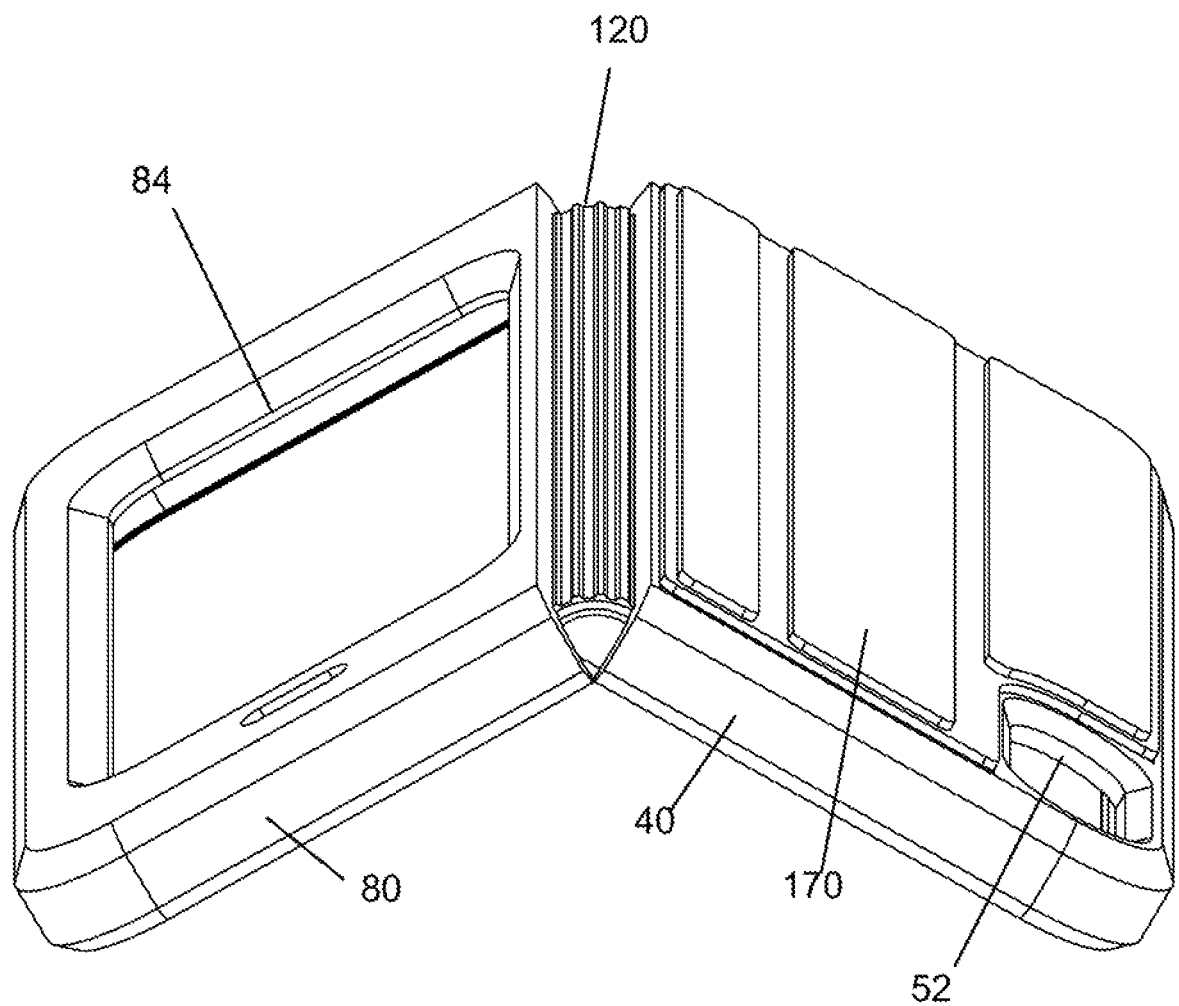
FIG. 9 is a partial back end perspective view of the carrying case in accordance with the present invention and showing the back of the carrying case in a partially open position without a foldable smart phone contained by the carrying case.
Figure 10:
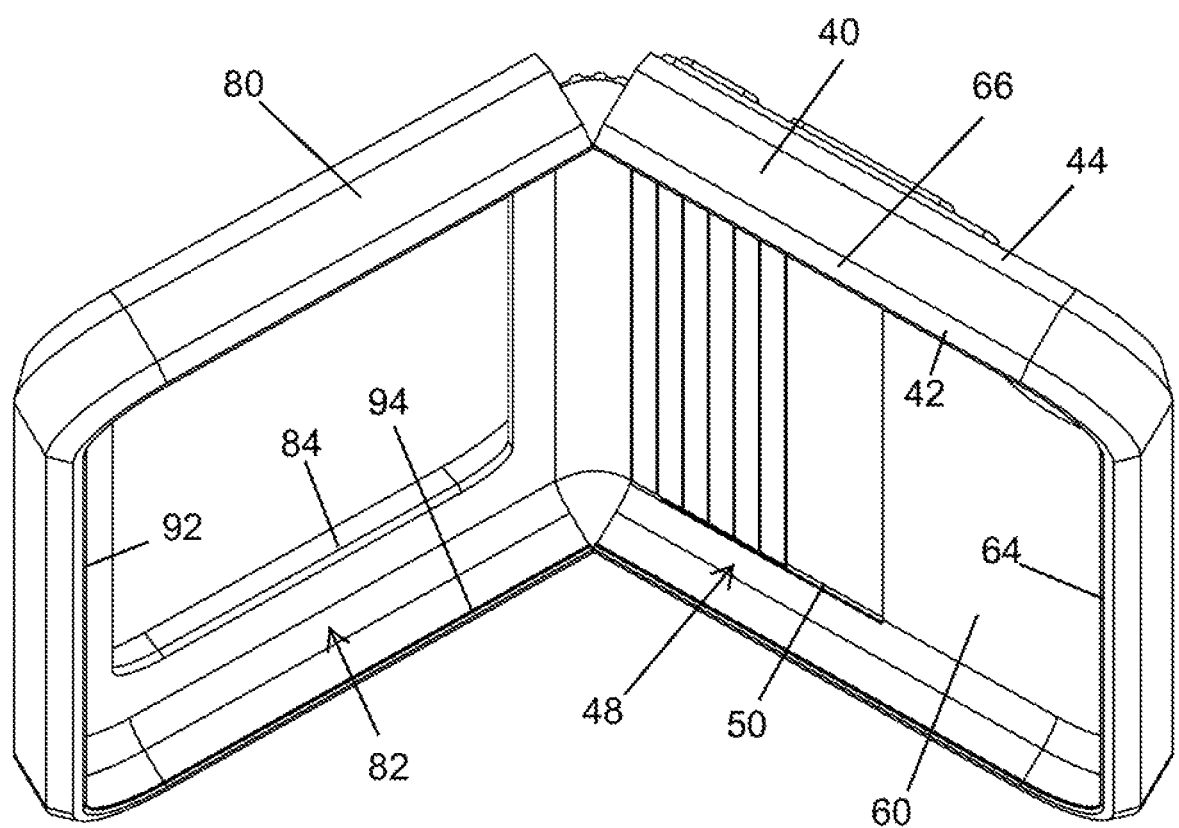
FIG. 10 is a partial front end perspective view of the carrying case of the type illustrated in FIG. 9 and illustrating the front of the carrying case in a partially open position without a foldable smart phone contained by the carrying case.
Figure 11:
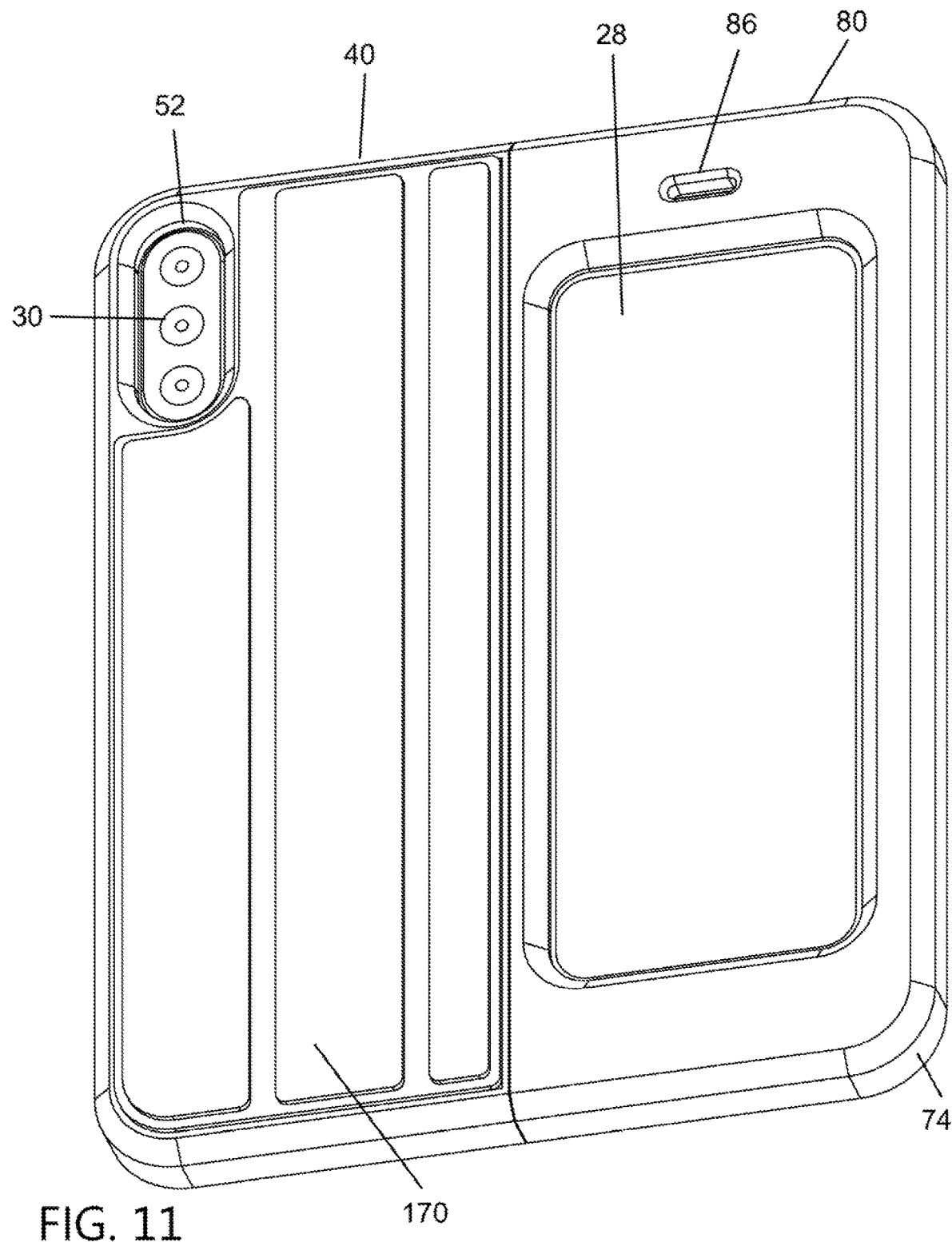
FIG. 11 is a back perspective view of the carrying case in accordance with the present invention showing a back portion of the carrying case and illustrating a foldable smart phone contained by the carrying case in an unfolded and open position.
Figure 12:
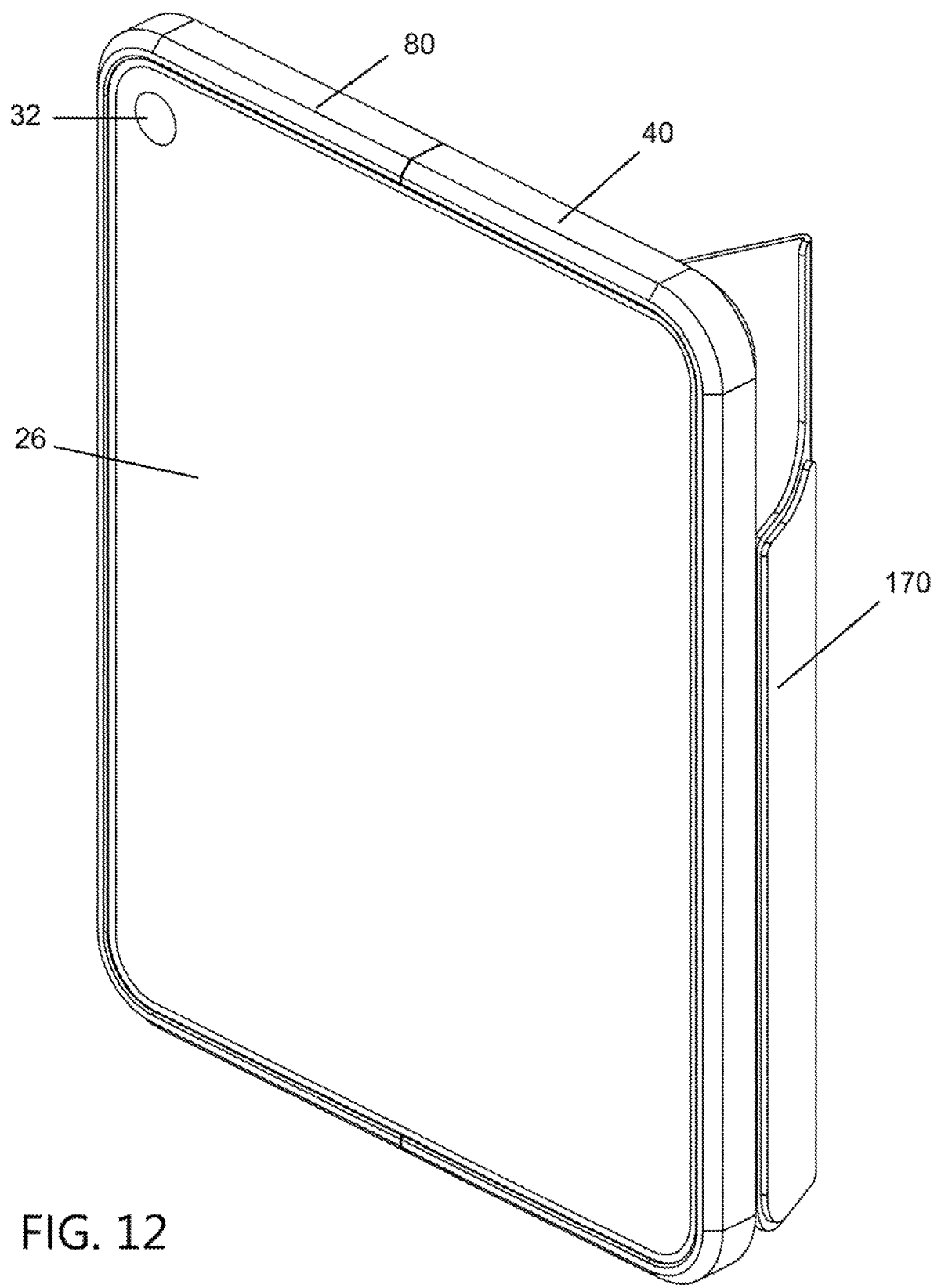
FIG. 12 is a front perspective view of the carrying case in accordance with the present invention showing a front portion of the carrying case and illustrating a foldable smart phone contained by the carrying case in an unfolded and open position.
Figure 13:
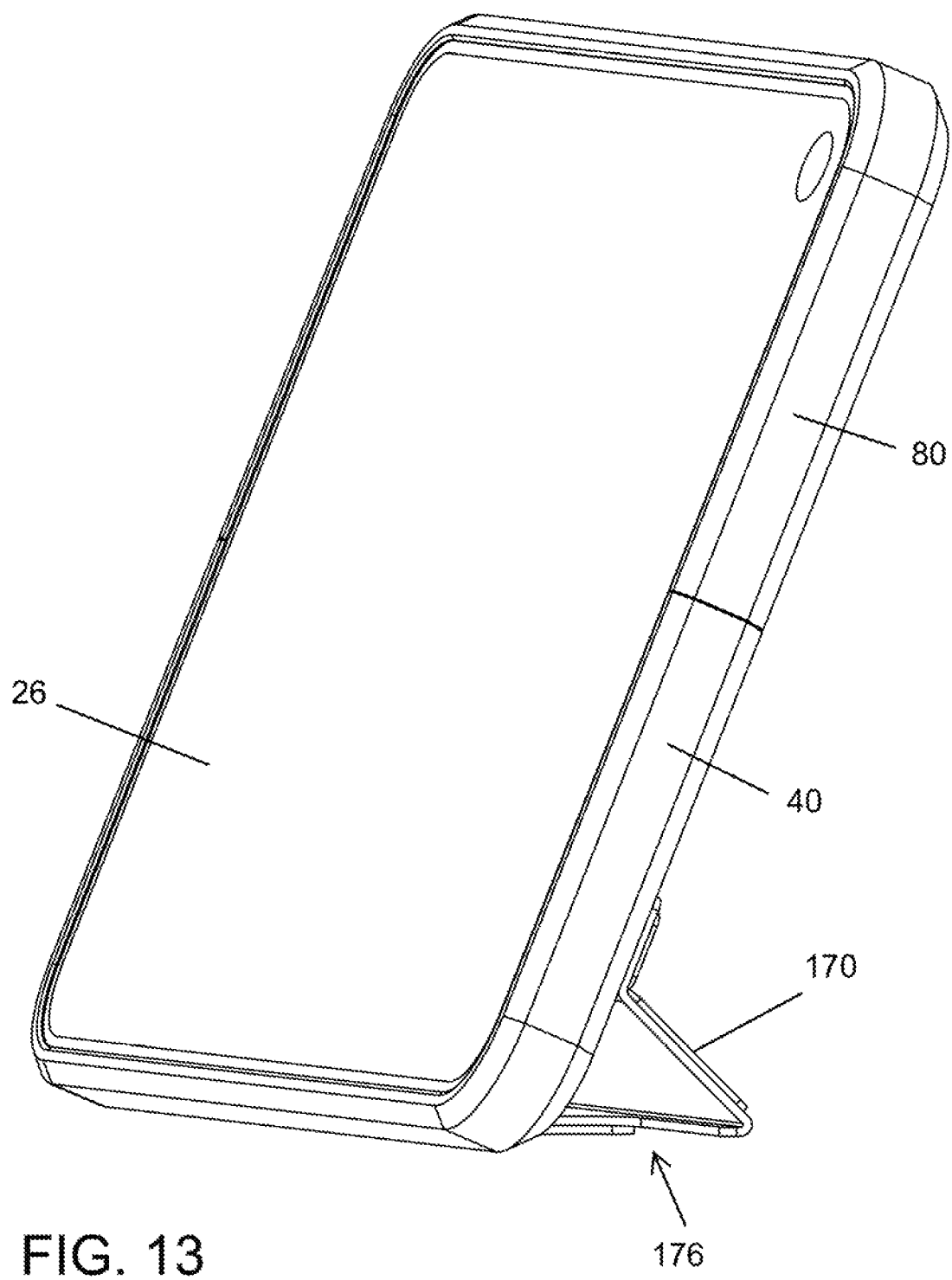
FIG. 13 is a front end perspective view of the carrying case in accordance with the present invention showing a front end portion of the carrying case and illustrating a foldable tablet contained by the carrying case in an unfolded and open position and utilizing the foldable stand for support.
Figure 14:
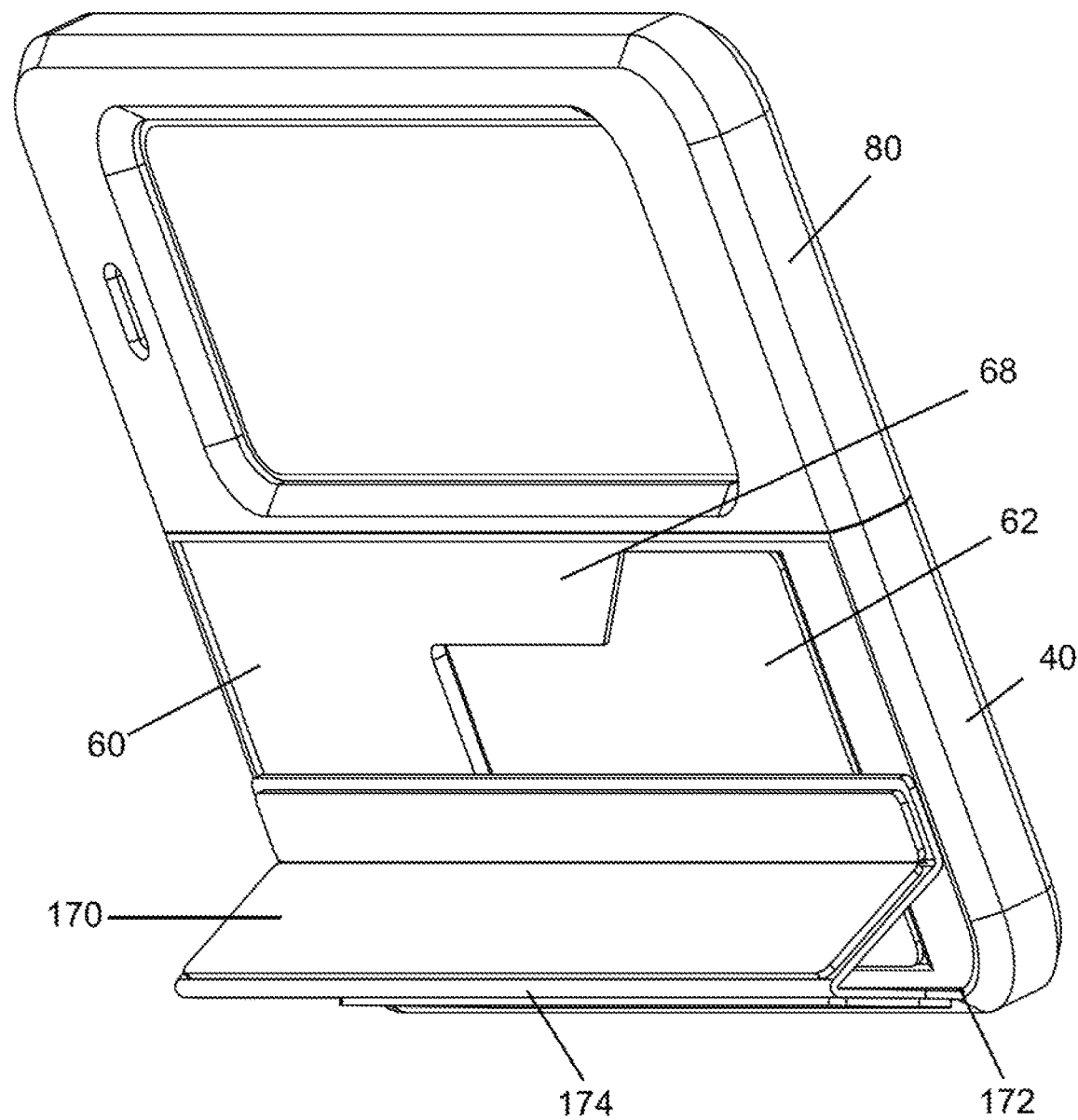
FIG. 14 is a back end perspective view of the carrying case in accordance with the present invention showing a back end portion of the carrying case and illustrating the carrying case in an unfolded and open position and utilizing the foldable stand for support.
Figure 15:
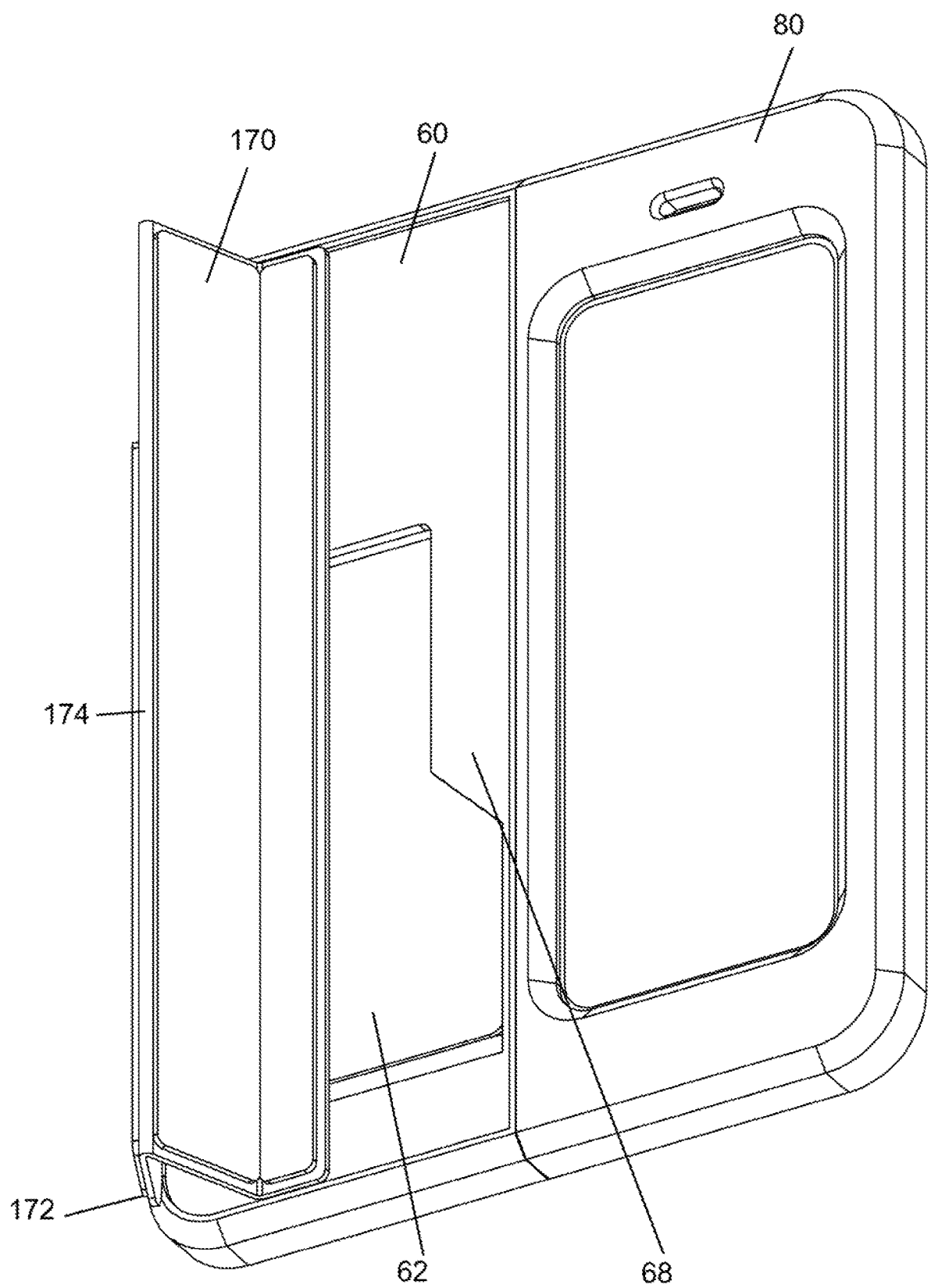
FIG. 15 is a back perspective view of the carrying case in accordance with the present invention showing a back portion of the carrying case and illustrating the carrying case and support stand in open positions.
Figure 16:
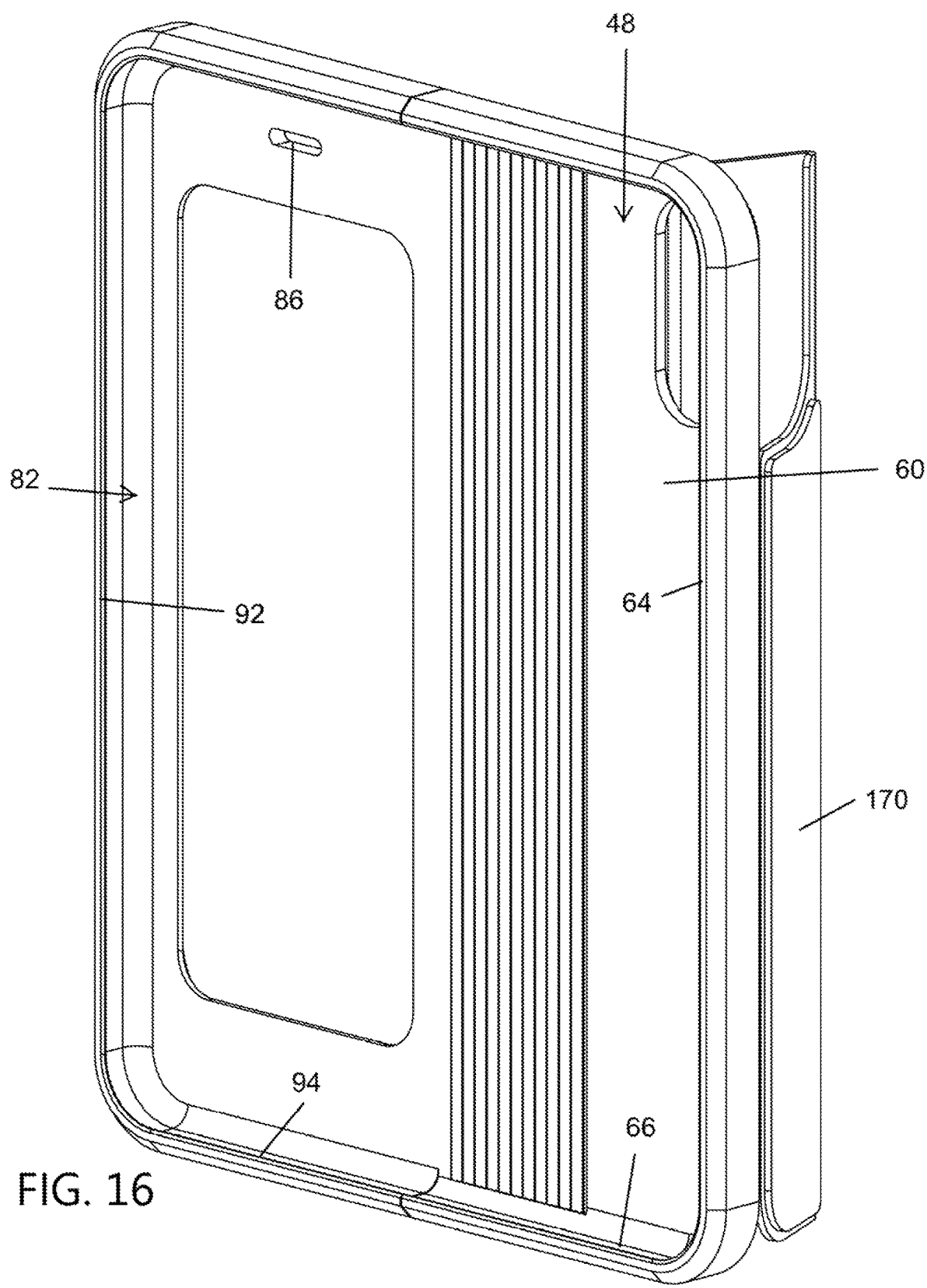
FIG. 16 is a front perspective view of the carrying case in accordance with the present invention showing a front portion of the carrying case and illustrating the carrying case and support stand in open positions.
Figure 17:
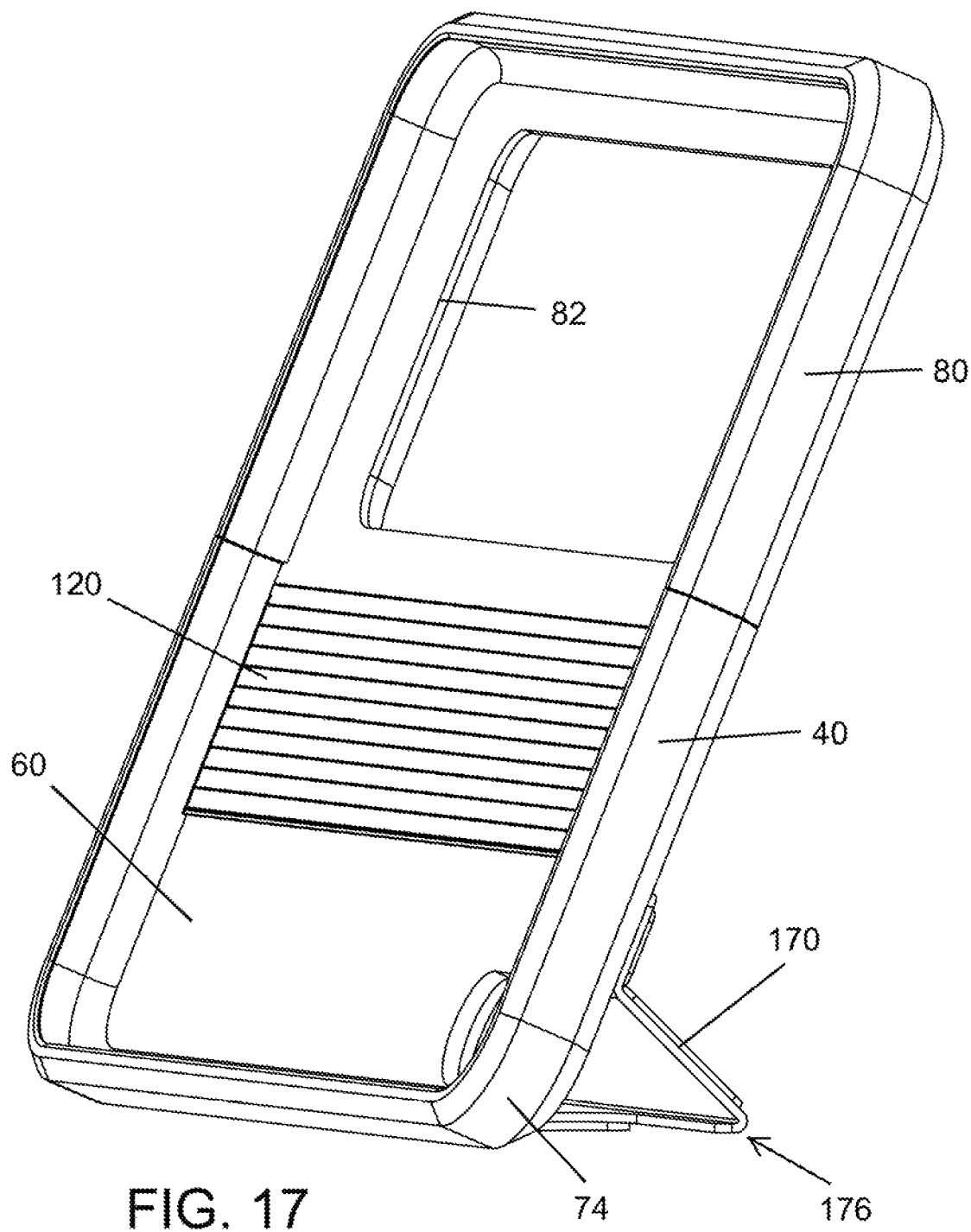
FIG. 17 is a front end perspective view of a carrying case in accordance with the present invention illustrating the case and stand in open positions and oriented to utilize the foldable stand.

The following description provides detail of various embodiments of the invention, one or more examples of which are set forth below. Each of these embodiments are provided by way of explanation of the invention, and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

In an embodiment of the invention a slender and compact protective cover or carrying case 10 is provided that minimizes the bulkiness and weight of the protective case for a foldable mobile device 20 while maintaining impact protection and additional versatility. The protective covering 10 for the foldable mobile electronic device 20 is configured to be user removable from the foldable device. The foldable mobile device includes a front display 26 formed from first and second halves 22 and 24 of the mobile device 20 and a rear display 28 exposed on a back side of one of the halve portions 22 or 24 of the mobile device. The front display 26 may include front camera 32 and the rear or back 28 may include a rear camera 30. Further, the front display 26 is not visible when the mobile electronic device 20 is in a folded position.

In accordance with aspects of the invention the protective covering includes a two piece casing or first and second shielding bodies 40 and 80. The first and second case 40 and 80 are interconnected and coupled via an extendable hinge 120. A multi jointed panel or cover 170 is attached to first case 40. The panel or cover 170 may lay flat against the first case 40 to conceal a storage compartment 56 formed in the first case 40.

The first case includes a first side 42 and second side 44. First cavity 48 is formed in and extends into the first side 42 of the first case 40. Similarly, a second cavity 56 is formed in and extends into the second side 44 of the first case 40. Further, the first and second cavity 48 and 56 are separated by a dividing wall 60, wherein the first cavity 48 is adapted for receiving a first halve 22 of the mobile device and the second cavity 56 is adapted for receiving one or more articles. The first case 40 and second case 80 are dimensioned to extend and wrap around a majority of the perimeter of the mobile device and cover a back of each halve 22 and 24 of the mobile device 20.

With reference to the Figures various aspects of the invention will be further described. FIGS. 1-5 illustrates an exemplary foldable mobile electronic device 20 inserted and contained within the protective case or covering 10 of the present invention. Those skilled in the art will appreciate that the length, width and thickness of the components of the protective cover 10 may be modified to accommodate various electronic devices including, without limitation intended, various cell phone makes and models, tablets and laptops. An outer perimeter portion of each case 40 and 80 is bendable or flexible and overlaps side edges and ends of the mobile device 20 to retain the mobile device 20 within cavity 48 formed in the first case 40 and in cavity 82 formed in the second case 80. The cases 40 and 80 are made from a resilient material to allow a user to slightly bend the outer perimeter sides to allow insertion of the mobile device into the cavities 48 and 82 of the respective cases 40 and 80. Once inserted, the resilient sides return to their previous position such that the overlapping lip portion of the sidewalls retains the mobile device within the cavities.

Case 40 and case 80 are interconnected by hinge 120. The hinge 120 includes corrugations 126 that form folds 128 and hinge joints 130. When the mobile device 20 is positioned in the folded orientation the hinge 120 bends in an arc and provides a protective covering along the fold axis of the mobile device 20. Further, when the mobile device is in the folded position the back display 28 is visible through the window 84 formed in the second case 80 and a camera 30 lens is visible through window 52 formed in the dividing wall 60 of first case 40. Also, aperture 86 extends through the second case 80 and is oriented to align with a speaker of the mobile device 20. Those skilled in the art will appreciate that other slots and apertures may be formed in case 40 and 80 so that the apertures align with other speakers, microphones, cameras, electrical plugins, control ports, etc. of various mobile devices. Further, the position and dimensions of the openings may be formed to accommodate a particular make and model of the mobile device 20. Additionally, the cover panel 170 may be positioned flat against the first case 40 to conceal the second cavity or storage compartment 56.

FIGS. 6-10 further illustrates the protective cover 10 of a foldable mobile device 20 in a partially open orientation. The protective case 10 includes cases 40 and 80 that have resilient sidewalls 64 and 92 respectively and resilient endwalls 66 and 94 respectively. The sidewalls 64 and 92 and endwalls 66 and 94 extend around a portion of the sides of the mobile device 20, thereby providing a slim look and reducing the bulk of the protective case. The cover panel 170 includes a fixed hinge or joint 172 that attaches the panel to the first case 40 and further includes multiple hinge points or folds 174 that allow the panel to be folded and positioned in multiple orientations. Cushion members or resilient padded corners 74 of the first and second case 40 and 80 may provide additional shock absorption at critical points on the mobile device 20. For example, the cushioning members 74 may be made from a more absorbing material and formed congruent with the first and second case 40 and 80.

FIGS. 11-17 illustrates the concealed storage compartment 56 and cover 170. The first case 40 includes a second cavity 56 that may be utilized as a concealed storage compartment. The second cavity 56 is formed into the second side 44 of the first case 40. The first cavity 48 and second cavity 56 are separated and divided by dividing wall 60. Those skilled in the art will appreciate that the dividing wall may provide complete separation between the first and second cavities 48 and 56 (as shown) or may be partially enclosed, thereby utilizing the back of the mobile device 14 to divide the cavities. The first cavity 48 is suitable and adapted for receiving a mobile device and the second or outer cavity 56 is adapted to receive articles. By way of example, credit cards or ID cards may fit within the second cavity 56. To access a card from the storage compartment 56 the user slides the panel 170 along flanges 68 to an open position that exposes the credit card. The user may then push or slide an edge of the card to slide the card under the flange 58 and out of the storage compartment 56. The cavity 56 may include a stepped recess 62 and may further include flanges extending inward to block a portion of the cavity 56. In this manner, the flange 68 may form a stop that restricts articles from falling out of the cavity 56.

FIGS. 12-17 illustrates the various orientations of the protective covering 10 utilizing the cover panel 170 as a stand 176. The first case 16 is shown with the multi hinged panel 170 attached thereto. Those skilled in the art will appreciate the panel 170 may be formed integral with the first case 40, may be permanently attached to the case 40, or may be removably attached to the case 40. Magnets may be fixed to the case 40 and panel 170 may include metal strips or magnets embedded or associated with the hinged panel. The metal strips or magnets cooperate with magnets on case 40 to fix the panel 170 in a desired position relative to case 40. The magnets and metal strips may also cooperate with other magnets or metal surfaces to couple the protective case 10 to other bodies. For example, the magnets may cooperate with the metal body of a refrigerator allowing the user to essentially hang the protective case and allow a user to view the display without using hands. Further, a clip having a magnet may be utilized to cooperate with the protective cover and clip to a desired surface or structure. For example, without limitation, the user may clip onto an air vent in a vehicle to allow the user to display the mobile device at a desired angle without the need to hold the device.

The various orientations of the cover panel 170 further allows a user to vary the angle of the display screen of the mobile device 20 when propped on a flat surface. Depending upon the orientation of the cover panel 170, a user may choose to rest the protective cover 10 against the flat surface at various viewing angles ranging from 15-45 degrees from vertical or from 20-25 degrees from a horizontal viewing angle.

Figure 18:
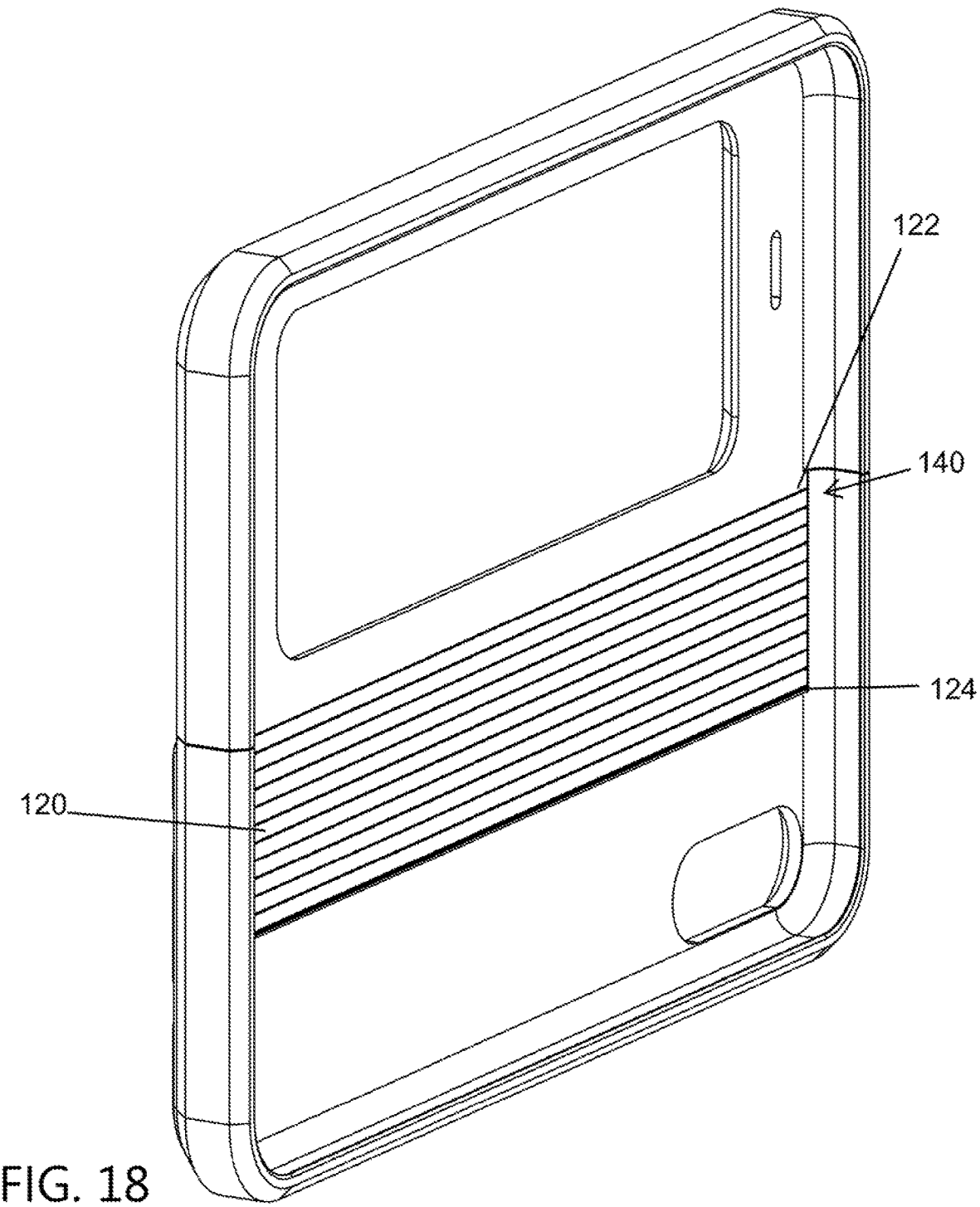
FIG. 18 is a front end perspective view of a carrying case in accordance with the present invention showing the carrying case in an open position.
Figure 19:
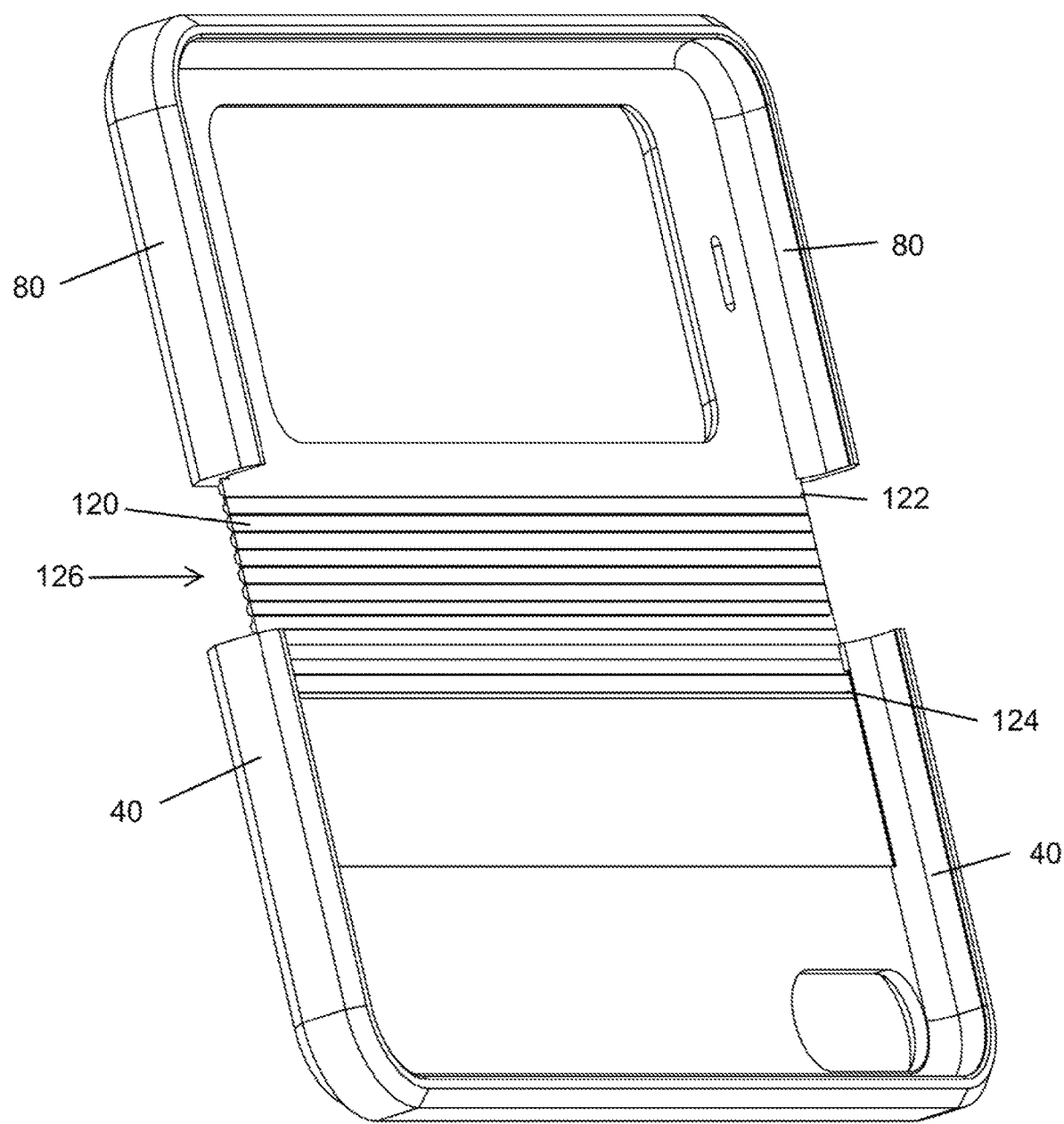
FIG. 19 is a front perspective view of a carrying case in accordance with the present invention showing the case in an open position and illustrating the hinge portion in a flat extended position.
Figure 20:
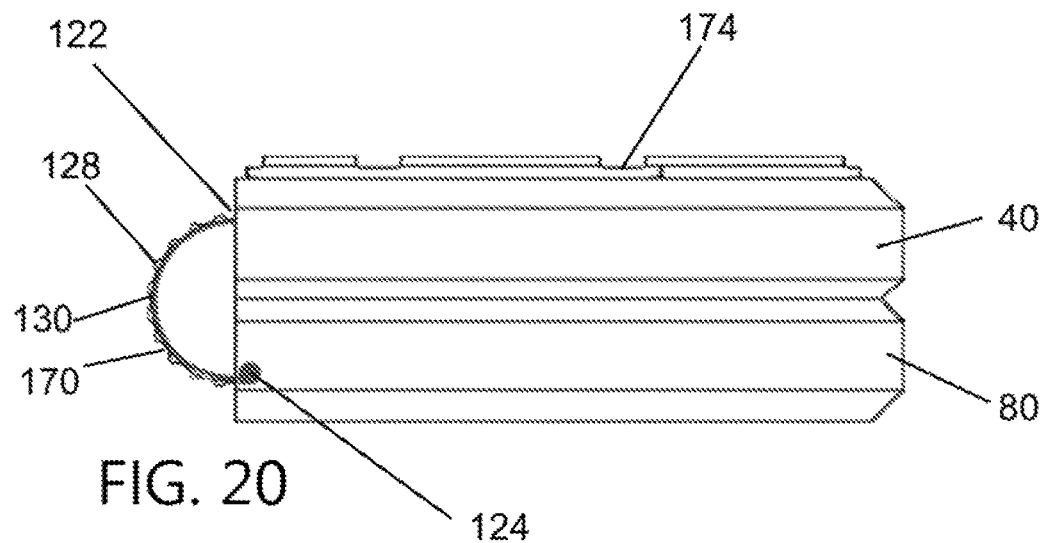
FIG. 20 is a partial section end perspective view of a carrying case in accordance with the present invention illustrating the carrying case in a folded position and the hinge in a bent position.
Figure 21:
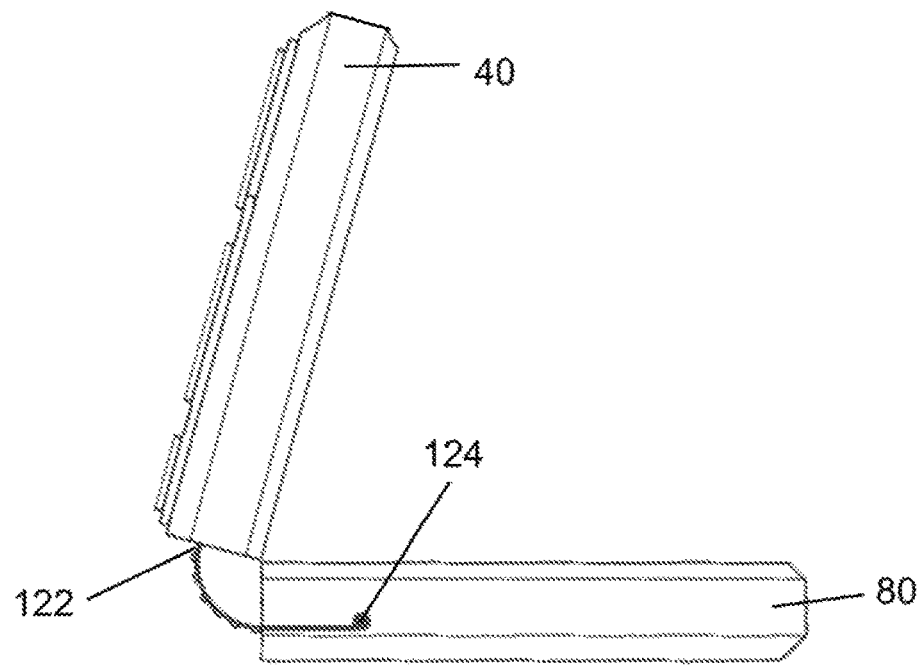
FIG. 21 is a partial section end perspective view of a carrying case in accordance with the present invention illustrating the carrying case and hinge in a partially open position.
Figure 22:
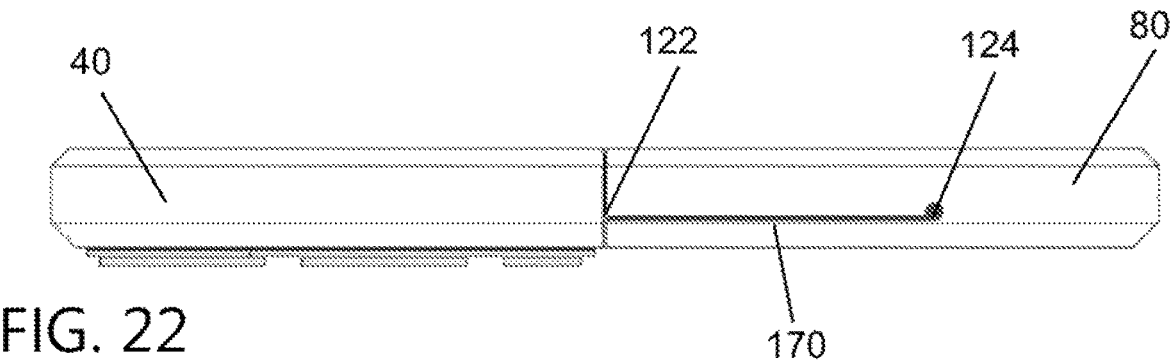
FIG. 22 is a partial section end perspective view of a carrying case in accordance with the present invention illustrating the carrying case and hinge in an open flat position.

FIGS. 18-22 further illustrates the orientation of hinge 120 in a folded 136, partially open 138, and open 140 position. An embodiment of the invention is illustrated in FIGS. 18 and 19 having a first end 122 of hinge 120 fixed to the second case 80 and having a second or free end 124 of the hinge sliding within slots or guide channels 50 formed in first case 40. When the hinge is bent 132 the free end of the hinge slides in the channel toward the outer side of the case 40. When the hinge 120 is flattened, the free end of the hinge slides in the channel into the case 40. The width of the hinge is dependent upon the amount of travel required within the slot or channel 50. Alternatively, FIGS. 20-22 illustrate the protective cover 10 having a first end 122 of hinge 120 fixed to the first case 40 and having a free end 124 of the hinge sliding within slots or guide channels 50 formed in second case 80. When the hinge is bent 132 the free end 124 of the hinge slides in the channel 50 toward an outer side of the case 80. When the hinge 120 is flattened, the free end of the hinge slides in the channel 50 into the case 80. The width of the hinge is dependent upon the amount of travel required within the slot or channel 50.

The various embodiments described herein are illustrative of the present invention and not limiting as to the scope and spirit of the present invention. These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A protective covering for a foldable mobile electronic device such that the protective covering is configured to be user removable from the foldable mobile device, wherein the mobile device includes a front display formed from halves of the mobile device and a rear display exposed on a back side of one of the halves of the mobile device, wherein the front display is not visible when the mobile electronic device is in a folded position, the protective covering comprising:
   a first case having a first cavity formed into a first side of the first case and a second cavity formed into a second side of the first case, wherein the first side of the first case opposes the second side of the first case;
   wherein the first and second cavity are separated by a dividing wall such that the first cavity is adapted for receiving a first portion of the foldable mobile electronic device and the second cavity is adapted for receiving one or more articles;
   a second case having a recess adapted for receiving a second portion of the foldable mobile electronic device and having a window extending through the second case to expose the rear display when the foldable mobile electronic device is contained within the protective covering;
   the first case interconnected to the second case with a hinge; and
   a cover panel having a first end portion fixed to an outer surface of the first case and a second free end portion that is adapted to extend over and cover the second cavity.

2. The protective covering as recited in claim 1, further including an aperture extending through the dividing wall of the first case, wherein the aperture is adapted to align with at least a portion of a camera lens of the foldable mobile electronic device.

3. The protective covering as recited in claim 1, wherein the cover panel includes a plurality of joints.

4. The protective covering as recited in claim 3, wherein the cover panel is adaptable to fold and provide a stand for the support.

5. The protective covering as recited in claim 1, wherein the hinge includes a plurality of folds around which the hinge pivots.

6. The protective covering as recited in claim 1, wherein a first end of the hinge is fixed to the second case and a second end of the hinge slides within slots formed in the first case.

7. The protective covering as recited in claim 6, further wherein portions of the hinge extends from the slots formed in the first case when the foldable electronic device is in the folded position and retracts along the slots when the foldable electronic device is in the open position.

8. The protective covering as recited in claim 1, wherein the hinge both bends and slides between a first closed position and a second open position of the foldable electronic device.

9. The protective covering as recited in claim 8, wherein the folds are defined by a plurality of hinge joints.

10. A protective covering for a foldable mobile electronic device configured to be user removable from the foldable mobile device, wherein the mobile device includes a front display formed from halves of the mobile device and a rear display exposed on a back side of one of the halves of the mobile device, wherein the front display is not visible when the mobile electronic device is in a folded position, the protective covering comprising:
   a first case having a first cavity formed into a first side of the first case and a second cavity formed into a second side of the first case, wherein the first side of the first case opposes the second side of the first case;
   wherein the first and second cavity are separated by a dividing wall such that the first cavity is adapted for receiving a first portion of the foldable mobile electronic device and the second cavity is adapted for receiving one or more articles; further including a window formed and extending through the dividing wall, wherein the window is adapted to align and encompass at least a portion of a camera aperture of the foldable mobile electronic device;
   a second case having a recess adapted for receiving a second portion of the foldable mobile electronic device and having a window extending through the second case to expose the rear display when the foldable mobile electronic device is contained within the protective covering;
   the first case interconnected to the second case with a hinge, wherein the hinge includes a plurality of folds around which the hinge pivots, wherein a first end of the hinge is fixed to the second case and a second end of the hinge slides within slots formed in the first case; and further wherein portions of the hinge extends from the slots formed in the first case when the foldable electronic device is in the folded position and retracts along the slots when the foldable electronic device is in the open position;
   a cover panel having a first end portion fixed to an outer surface of the first case and a second free end portion that is adapted to extend over and cover the second cavity.

11. The protective covering as recited in claim 10, wherein the cover panel is adaptable to fold and provide a stand for the support.

12. The protective covering as recited in claim 10, wherein the hinge both bends and slides between a first closed position and a second open position of the foldable electronic device.

* * * * *